C. L. THOMAS.
AUXILIARY SPRING FOR AUTOMOBILES.
APPLICATION FILED AUG. 21, 1909.
966,621.
Patented Aug. 9, 1910.
2 SHEETS—SHEET 1.
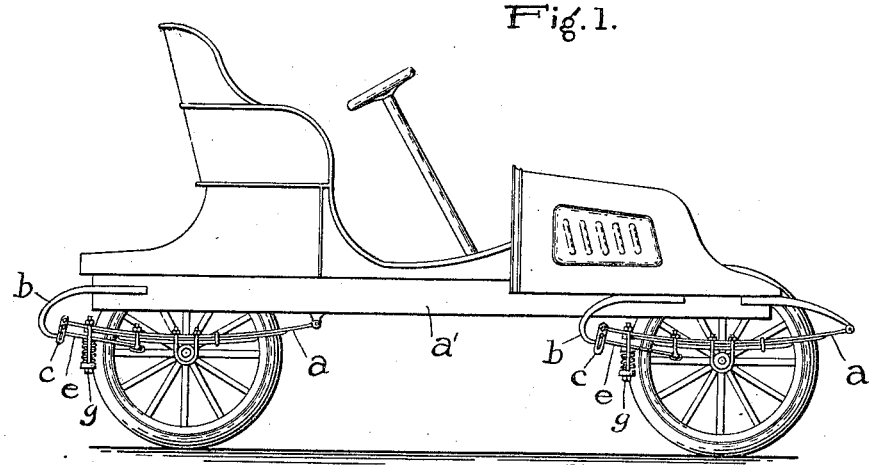
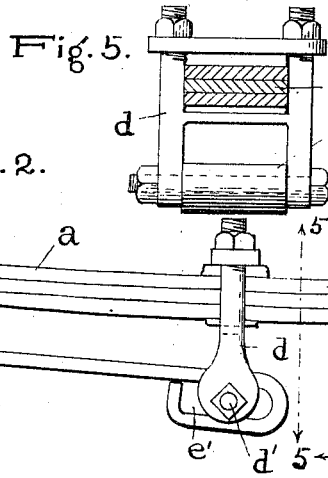
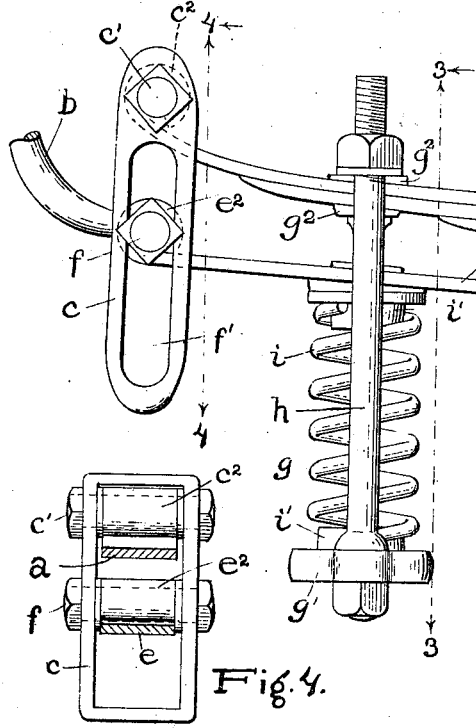
Witnesses
Stuart Hilden
Frances M. Anderson
Inventor
Charles L. Thomas
by E. W. Anderson
his Attorneys C. L. THOMAS.
AUXILIARY SPRING FOR AUTOMOBILES.
APPLICATION FILED AUG. 21, 1909.
966,621.
Patented Aug. 9, 1910.
2 SHEETS—SHEET 2.
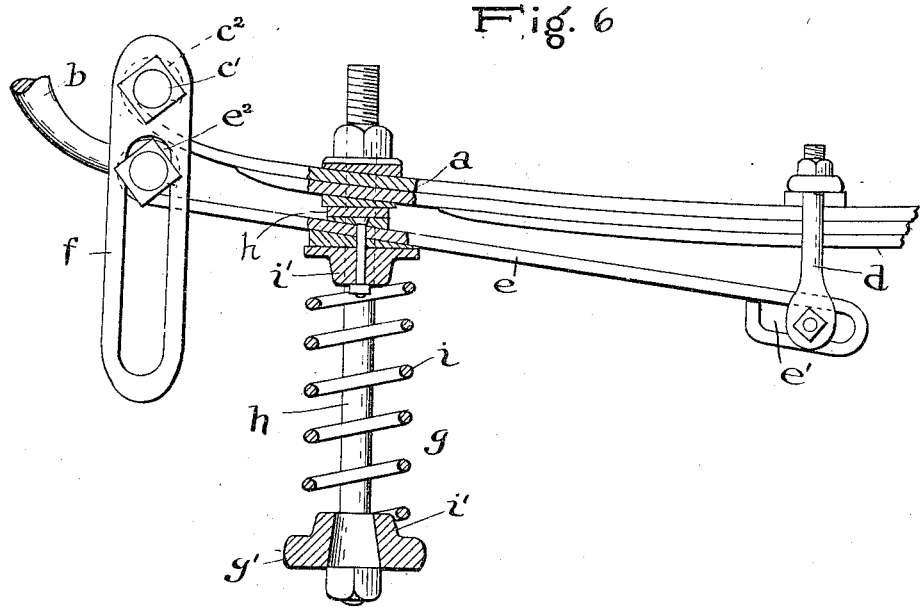
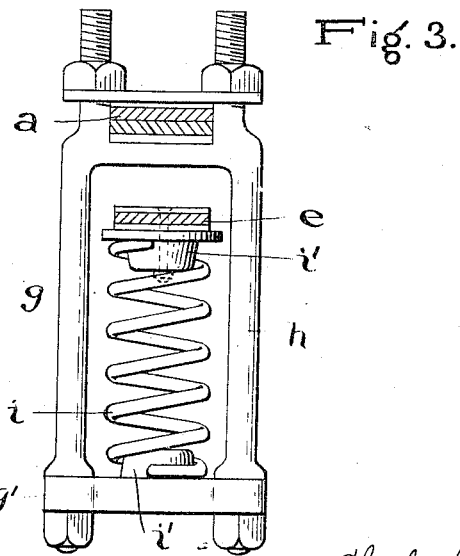

UNITED STATES PATENT OFFICE.

CHARLES L. THOMAS, OF CANISTEO, NEW YORK.

AUXILIARY SPRING FOR AUTOMOBILES.

966,621. Specification of Letters Patent. Patented Aug. 9, 1910.

Application filed August 21, 1909. Serial No. 514,044.

*To all whom it may concern:*

Be it known that I, CHARLES L. THOMAS, a citizen of the United States, resident of Canisteo, in the county of Steuben and State of New York, have made a certain new and useful Invention in Auxiliary Springs for Automobiles; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of the invention as applied. Fig. 2 is a side view of the invention on a larger scale. Fig. 3 is a section on the line 3—3, Fig. 2. Fig. 4 is a section on the line 4—4, Fig. 2. Fig. 5 is a section on the line 5—5, Fig. 2. Fig. 6 is a side view partly in section showing the position of the lever upon the rebound in taking a bearing against the leaf spring.

The invention has relation to an improved auxiliary spring for automobiles, having for its object the prevention of side sway of the vehicle body with relation to its springs, at the same time serving as an efficient check for objectionable upthrow of the vehicle body due to a faulty roadbed, and cushioning the downward movement of the body.

The invention consists in the novel construction and combinations of parts as hereinafter set forth.

In the accompanying drawings, illustrating the invention, the letter $a$, designates a leaf spring support for the vehicle body $a'$, which may be a half spring or the lower half of an elliptic spring, should such be used; $b$, the body hanger, and $c$, a loose shackle connection to the end of the leaf spring.

$d$, is a depending clip fastened to the leaf spring $a$, and provided with a lower transverse journal pin or bolt $d'$, for a lever $e$, having a fulcrum slot $e'$, engaging said pin, said lever extending under and in the same direction as the spring $a$, and terminating adjacent to the outer end of the spring in an eye $e^2$, having a transverse bolt connection $f$, with the body hanger $b$, said bolt having engagement with slots $f'$, $f'$, in the sides of the shackle $c$, which has a bolt connection $c'$, with an eye $c^2$, in the outer end of the leaf spring.

Intermediate of the ends of the lever $e$, and nearer its outer end is located a depending spring hanger $g$, which is fastened to the leaf spring $a$, intermediate washers $g^2$, $g^2$, being employed and is provided with a crosshead $g'$, connecting the lower ends of its lateral branches $h$, $h$, a strong coil spring $i$, being interposed between said cross-head and the lever $e$, which thus rests upon the coil spring. The lever and cross-head are designed to have oppositely extending boss projections $i'$, $i'$, fitting in the coils of the spring, such coils being prevented from moving laterally by the branches $h$, $h$, of the clip. The lever $e$, is prevented from moving laterally at its outer end by the sides of the shackle $c$, between which it works, and at its inner end by the branches of the clip $d$, and intermediately of its ends by the branches of the hanger $g$.

When the vehicle body descends, owing to inequalities in the roadbed and weight of load, the lever $e$, will take a fulcrum upon the bolt $d'$, and press downward upon the coiled spring or cushion, the transverse bolt connection $f$, of said lever moving down in the slots of the shackle $c$, while slight longitudinal movement of the lever is provided for by the slot and bolt connection, at its inner end, with the clip $d$. Indirectly through strain upon the spring hanger $g$, the leaf spring will also be caused to move downward, but the coil springs employed are designed to be of such character as to substantially bear the load and cushion the same except when the load is heavy or there is unusual jolting, when the leaf springs come into play. Upon the rebound reverse movement of the parts will take place, the lever $e$, taking a bearing against the leaf spring. My auxiliary coil or cushioning spring devices are in the more usual constructions designed to be attached to the rear end of the rear leaf springs and to the rear end of the front leaf springs.

Side sway of the vehicle body with relation to the leaf springs $a$, is guarded against and prevented by the end and intermediate braces for the levers $e$, and the lateral braces for the coil springs, as before explained, while objectionable upthrow of the vehicle body is prevented by the stiffening of the leaf spring $a$, due to the clip $d$, and hanger $g$, which impart sufficient rigidity to the end of the leaf spring to materially modify the upward push of the lever. The strength of the leaf spring is increased by the fastenings at $d$, and $g$, which are designed to more firmly bind the leaves thereof together and lessen liability of breakage or fracture.

Having thus described my invention, what I claim as new and desire to secure by Letters Patent is:

1. A hanger rigidly fastened to the leaf springs of a vehicle near the free end portion of said spring, an auxiliary upright compression spring carried by said hanger, and a lever having means of vehicle body attachment and fulcrum connection with said leaf springs, and resting upon said auxiliary spring.

2. A hanger, having lateral branches, fastened to the leaf spring of a vehicle, an auxiliary spring carried by said hanger, a lever having means of vehicle body attachment, fulcrum connection with said leaf spring and a loose shackle connection with the leaf spring, said lever extending between the branches of said hanger and bearing upon the auxiliary spring.

3. The combination with the leaf spring of a vehicle, of a hanger fastened thereto and having lateral branches and a lower cross-head, an auxiliary spring upon said cross-head, and a lever having a fulcrum connection with said leaf spring, extending between the branches of said hanger and bearing upon the auxiliary spring, said lever having means of vehicle body attachment.

4. A hanger clipped to the leaf spring of a vehicle, a coil spring carried by said hanger, a lever having a fulcrum slot and bolt connection with said leaf spring and a loose shackle connection with the leaf spring, said lever resting upon said auxiliary spring between the same and said leaf spring, and having means of vehicle body attachment.

5. Resilient means in connection with an elliptic or leaf spring for supporting a vehicle body on the running gear, consisting of a hanger fastened to the leaf spring near the free end portion thereof, an upright coil spring carried by said hanger, and a lever connected to said leaf spring and to said body and bearing on said coil spring.

6. The combination with the leaf spring for a vehicle of a hanger carried by the leaf spring near the free end portion thereof and having lateral branches, a compression spring carried by said hanger, a lever having fulcrum connection with the leaf spring, passing through the lateral branches of the hanger, bearing upon the compression spring and having connection with the vehicle body.

In testimony whereof I affix my signature, in presence of two witnesses.

CHARLES L. THOMAS.

Witnesses:
HERMAN E. BUCK,
G. T. MEEKS.